United States Patent
Dickinger et al.

(10) Patent No.: US 10,253,816 B2
(45) Date of Patent: Apr. 9, 2019

(54) BEARING COVER

(71) Applicant: Miba Sinter Austria GmbH, Laakirchen (AT)

(72) Inventors: Karl Dickinger, Vorchdorf (AT); Markus Schauer, Gunskirchen (AT); Martin Karlsberger, Eberstalzell (AT)

(73) Assignee: Miba Sinter Austria GmbH, Laakirchen (AT)

( * ) Notice: Subject to any disclaimer, the term of this patent is extended or adjusted under 35 U.S.C. 154(b) by 0 days.

(21) Appl. No.: 15/872,143

(22) Filed: Jan. 16, 2018

(65) Prior Publication Data
US 2018/0216668 A1 Aug. 2, 2018

(30) Foreign Application Priority Data
Feb. 2, 2017 (AT) .................................. 50073/2017

(51) Int. Cl.
*F16C 9/02* (2006.01)
*F16C 35/00* (2006.01)
*F16C 35/02* (2006.01)
*F16C 17/02* (2006.01)

(52) U.S. Cl.
CPC .............. *F16C 35/00* (2013.01); *F16C 35/02* (2013.01); *F16C 9/02* (2013.01); *F16C 17/022* (2013.01)

(58) Field of Classification Search
CPC .... F16C 9/02; F16C 9/04; F16C 35/00; F16C 35/02
See application file for complete search history.

(56) References Cited

U.S. PATENT DOCUMENTS

| 1,283,803 | A | 11/1918 | Kirkham |
| 2,997,347 | A | 8/1961 | Bauer |
| 4,693,216 | A | 9/1987 | Ampferer et al. |
| 5,201,115 | A | 4/1993 | Inoue |
| 5,693,216 | A | 12/1997 | Hart et al. |
| 6,543,334 | B2 * | 4/2003 | Yamauchi ............... F02F 1/108 384/294 |
| 6,942,391 | B2 * | 9/2005 | Nakamura ............ F02F 7/0053 123/195 R |
| 8,690,439 | B2 | 4/2014 | Dickinger et al. |
| 9,353,787 | B2 * | 5/2016 | Vincent ..................... F16C 9/02 |

(Continued)

FOREIGN PATENT DOCUMENTS

| CN | 102 297 038 A | 12/2011 |
| CN | 105 257 406 A | 1/2016 |
| DE | 691 02 516 T2 | 9/1994 |

(Continued)

*Primary Examiner* — James Pilkington
(74) *Attorney, Agent, or Firm* — Collard & Roe, P.C.

(57) ABSTRACT

A bearing cover for a split bearing arrangement includes a stiffening element between threaded bores for receiving threaded bolts in order to connect the bearing cover to a bearing block. Provided between two clamping surfaces is a first radially inner bearing support surface having an at least approximately arcuate cross-section as viewed in the axial direction. Adjoining the bearing support surface and following the cross-sectional contour of the bearing support surface, a reinforcing web is provided on the stiffening element which has a varying height as viewed perpendicular to the bearing support surface, and the tallest height is disposed in the region of the half angular span of the bearing support surface.

9 Claims, 4 Drawing Sheets

(56) References Cited

U.S. PATENT DOCUMENTS

2004/0200053 A1  10/2004  Takahashi et al.
2004/0264822 A1  12/2004  Binder et al.

FOREIGN PATENT DOCUMENTS

| | | |
|---|---|---|
| DE | 44 33 252 A1 | 3/1996 |
| DE | 100 26 216 A1 | 3/2001 |
| DE | 60 2004 001 249 T2 | 10/2006 |
| DE | 10 2008 045 168 A1 | 5/2009 |
| DE | 20 2014 007 434 U1 | 12/2015 |
| EP | 1 286 068 A1 | 2/2003 |
| GB | 2 296 752 A | 7/1996 |
| JP | S56-133124 U | 10/1981 |
| JP | H07-305716 A | 11/1995 |
| JP | 10-238531 * | 9/1998 |
| WO | 2013/129350 A1 | 9/2013 |
| WO | WO2014/032687 * | 3/2014 |

* cited by examiner

BEARING COVER

CROSS REFERENCE TO RELATED APPLICATIONS

Applicant claims priority under 35 U.S.C. § 119 of Austrian Application No. A 50073/2017 filed on Feb. 2, 2017, the disclosure of which is incorporated by reference.

BACKGROUND OF THE INVENTION

1. Field of the Invention

The invention relates to a bearing cover for a split bearing arrangement which comprises a bearing block in addition to the bearing cover, the bearing cover having clamping surfaces which lie in contact with co-operating clamping surfaces of the bearing block when the bearing arrangement is in the assembled state, adjoined by threaded bores for receiving threaded bolts in order to connect the bearing cover to the bearing block, between which a stiffening element is provided, and a first radially inner bearing support surface having an at least approximately arcuate cross-section as viewed in the axial direction is provided between the two clamping surfaces.

The invention further relates to a bearing arrangement with a bearing cover and a bearing block lying in contact therewith.

2. Description of the Related Art

With a view to reducing the weight of bearing covers of split bearing arrangements, an approach known from the prior art, such as DE 60 2004 001 249 T2 for example, has been to make changes in terms of materials, i.e. to use light metal alloys.

However, solutions based on design have also been proposed as a means of reducing weight. For example, US 2004/264822 A1 describes a bearing cover for a crankshaft bearing of an internal combustion engine comprising a bearing shell, two threaded channels mounted on a side of the bearing shell for fastening to a bearing block and a brace of the bearing shell extending between the two threaded channels, the brace consisting of two struts extending obliquely from the region of upper ends of the threaded channels to the bearing shell and being of a substantially constant cross-section across their length and a rib which extends from one strut to the other on an upper side of the bearing shell.

Bearing covers based on similar designs with a view to reducing weight are known from U.S. Pat. Nos. 1,283,803 A, 2,997,347 A, 4,693,216 A and DE 100 26 216 A1.

SUMMARY OF THE INVENTION

The objective this invention was to propose a bearing cover of a reduced weight for a split bearing arrangement and/or a split bearing arrangement of a reduced weight.

This objective is achieved by means of the bearing cover outlined above, in which adjoining the bearing support surface and following the cross-sectional contour of the bearing support surface, a reinforcing web is provided on the stiffening element which has a varying height as viewed perpendicular to the bearing support surface, and the tallest height is disposed in the region of the half angular span of the bearing support surface.

The objective of the invention is also achieved by the bearing arrangement having the bearing cover as proposed by the invention.

The advantage of this is that with this bearing cover, a better distribution of the stress introduced into the material of the bearing cover when being clamped onto the bearing block can be obtained, thereby also enabling stresses occurring in the bearing cover after being clamped to the bearing block to be reduced. It is therefore possible to produce a bearing cover of reduced weight by means of a powder metallurgical process, thereby enabling a corresponding cost advantage to be obtained.

In order to further improve said distribution of stress and/or reduction of stress, the reinforcing web may also be disposed above the clamping surfaces.

To enable stress cracks to be more effectively prevented, a transition of the reinforcing web above the clamping surfaces to the reinforcing web above the bearing support surface is provided with a rounded region. This therefore also makes it easier to remove the bearing cover from the pressing mold for the sinter powder which can be used to produce the bearing cover.

Furthermore, a transition from the clamping surfaces to the bearing support surface may be of a chamfered design. This also helps to prevent the occurrence of cracks caused by excessive pressing of the sinter powder.

Based on another embodiment of the bearing cover, a region of the stiffening element may be provided with a thicker portion. Due to this thicker portion of material, the other regions of the stiffening element may be of a thinner design, thereby enabling a weight reduction to be obtained.

Likewise with a view to obtaining a further reduction in the weight of the bearing cover, at least one recess may be provided in the stiffening element.

A further reduction in the weight of the bearing cover can be obtained if the clamping surfaces are of an at least approximately trapezoidal shape as viewed in cross-section. This embodiment additionally improves the sintering process by which the bearing cover is made because the latter can be more easily removed from the mold.

Furthermore, at least one of several end faces is inclined with respect to the vertical. In addition to reducing the weight of the bearing cover, this also makes it easier to de-mold the bearing cover green compact from a die.

BRIEF DESCRIPTION OF THE DRAWINGS

To provide a clearer understanding, the invention will be explained in more detail below with reference to the appended drawings.

These are simplified, schematic diagrams respectively illustrating the following.

DETAILED DESCRIPTION OF THE PREFERRED EMBODIMENTS

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

Any figures specified in this description with respect to standards are based on the version of these standards valid on the date of this application, unless expressly stated otherwise.

Figure 1:
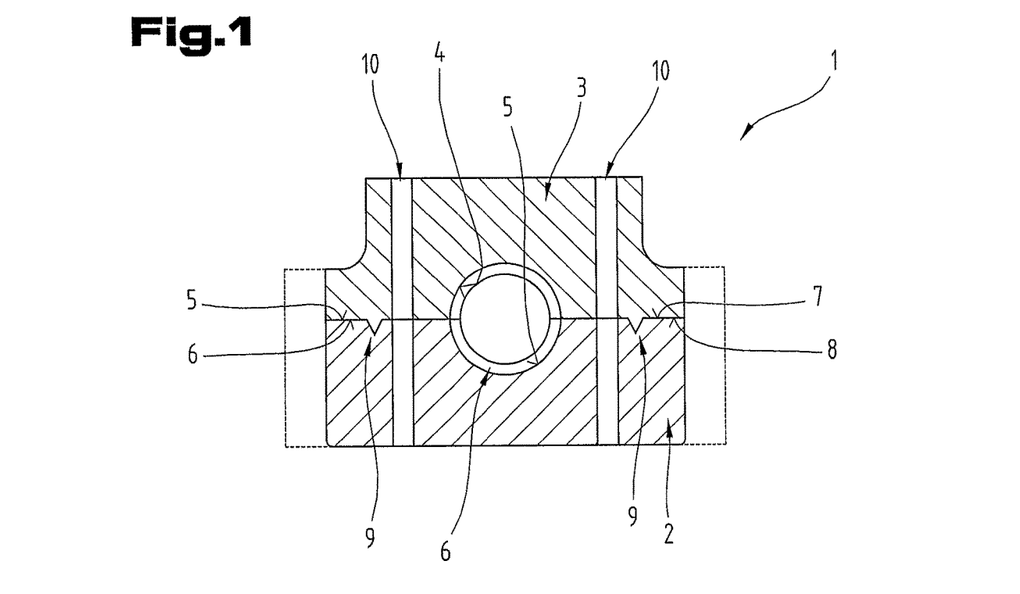
FIG. 1 a cross-section through a split bearing arrangement.

FIG. 1 illustrates a split bearing arrangement 1, such as might be used in an engine housing of a reciprocating piston engine, for example. This bearing arrangement 1 comprises a bearing block 2 and a bearing cover 3, which together provide a first and a second bearing support surface 4, 5 for receiving a friction bearing 6, for example for mounting a crankshaft. The friction bearing 6 may be provided in the form of two half-shells or a bush, for example. However, it would also be possible to provide the bearing support surfaces 4, 5 with a direct coating of a friction bearing material.

The bearing support surfaces 4, 5 are formed by radially inner surfaces of the bearing block 2 and/or bearing cover 3 which surround an orifice for receiving the component to be mounted.

The bearing cover 3 has a clamping surface 7 at each of its two distal end regions and the bearing block 2 has co-operating clamping surfaces 8 at each of its two end regions lying opposite the clamping surfaces 7 which lie in contact with one another when the bearing arrangement 1 is in the assembled state. Protruding out from the clamping surfaces 7 is at least one projection 9 per clamping surface 7 which is pressed into the co-operating clamping surface 8 of the bearing block 2 when the bearing arrangement 1 is in the assembled state by clamping the bearing block 2 and bearing cover 3. In order to clamp the bearing block 2 to the bearing cover 3, a bore, for example a continuous threaded bore 10, is provided in each of the distal end regions. Seated in this threaded bore 10 is a bolt, not illustrated, by means of which the clamping force is obtained in conjunction with appropriate nuts. Alternatively, this threaded bore 10 in the bearing block 2 and/or in the bearing cover 3 may not be based on a continuous design and is instead a blind bore with an internal thread.

Figure 5:
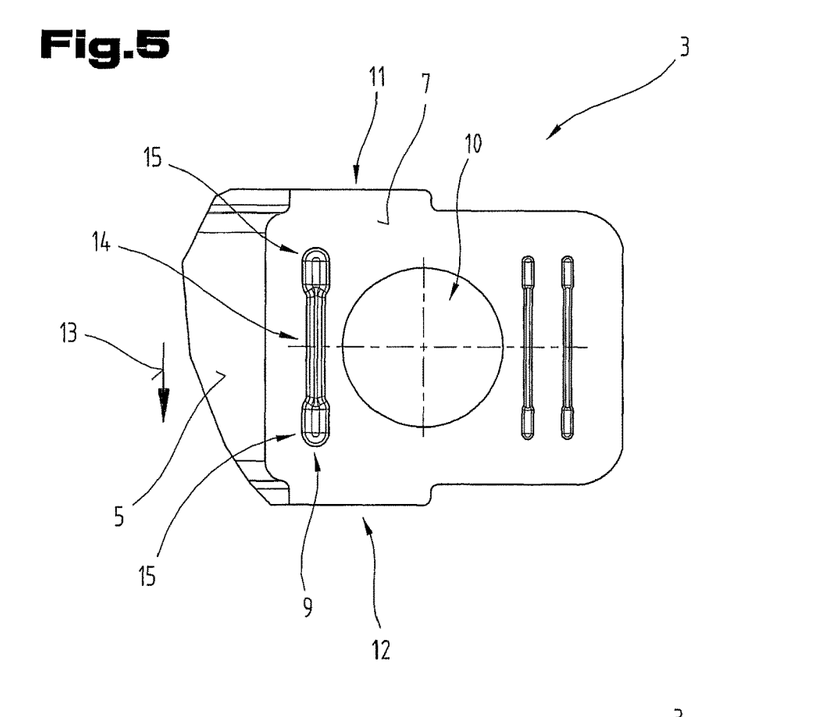
FIG. 5 a plan view of a clamping surface of the bearing cover.

The projections 9 may be approximately bone-shaped or strip-shaped for example, with a longitudinal extension in the direction from a front face 11 to a rear face 12 of the bearing cover 3 (in other words in an axial direction 13) as may be seen from FIG. 5 illustrating a plan view onto one of the clamping surfaces 7 of the bearing cover 3. The projections 9 preferably have a middle region 14 that is of a thinner design than the two end regions 15.

As may also be seen from FIG. 5, different projections 9 may also be provided on a clamping surface 7, for example a wide projection 9 and one or two or more thinner projections 9 relative thereto, and also in this case it may be preferable if all of the projections 9 are of a "bone-shaped" design, as explained above. In this embodiment, said wider projection 9 is preferably disposed closer to the bearing support surface 5 of the bearing cover 3 than the other projections 9. The wider projection 9 is also preferably disposed on one side of the threaded bore 10 and the one or more projections 9 that are thinner than it is/are preferably disposed on the other side of the threaded bore 10. In other words, the threaded bore 10 is preferably disposed between the wider and the one or more relatively thinner projections 9.

However, projections 9 of a different design could also be provided, for example based on a cutter-type shape, as known from U.S. Pat. No. 8,690,439 B2, so that combinations of shapes are also possible, in which case the bone-shaped projections 9 may instead be based on a cutter-type shape, for example. However, the described bone-shaped projections 9 are the preferred shape.

The projections 9 are also preferably formed integrally with the rest of the bearing cover 3.

Another option, indicated by broken lines in FIG. 1, is one where the distal end regions of the bearing cover 3 are disposed in the direction extending towards the bearing block 2 and extend laterally around it or, conversely, the bearing block 2 extends laterally around the bearing cover 3.

Similarly, the projections 9 may also be disposed on the co-operating clamping surfaces 8 of the bearing block 2, although it is preferable if they are disposed exclusively on the clamping surfaces 7 of the bearing cover 3.

At least the projections 9 are made from a material that is harder than the material of the bearing block 2 in the region of the co-operating clamping surface 8 so that these projections 9 can be pushed into the co-operating clamping surface 8 by pressing together and clamping the bearing block 2 and bearing cover 3. However, it is preferable for the entire bearing cover 3 to be made from this harder material. For example, the bearing cover 3 may be made from a ferrous material and the bearing block 2 from a light metal. In particular, the bearing cover 3 is made from a sintered ferrous material.

Generally, the bearing cover 3 is preferably made from a sintered material by means of a powder metallurgical process.

The first radially inner bearing support surface 4 of the bearing cover 3 and the second radially inner bearing support surface 5 of the bearing block 2 are disposed between the clamping surfaces 7 of the bearing cover 3 and co-operating clamping surfaces 8 of the bearing block 2. They respectively have an arcuate, in particular semi-circular, cross-section as viewed in the axial direction 13.

Figure 2:
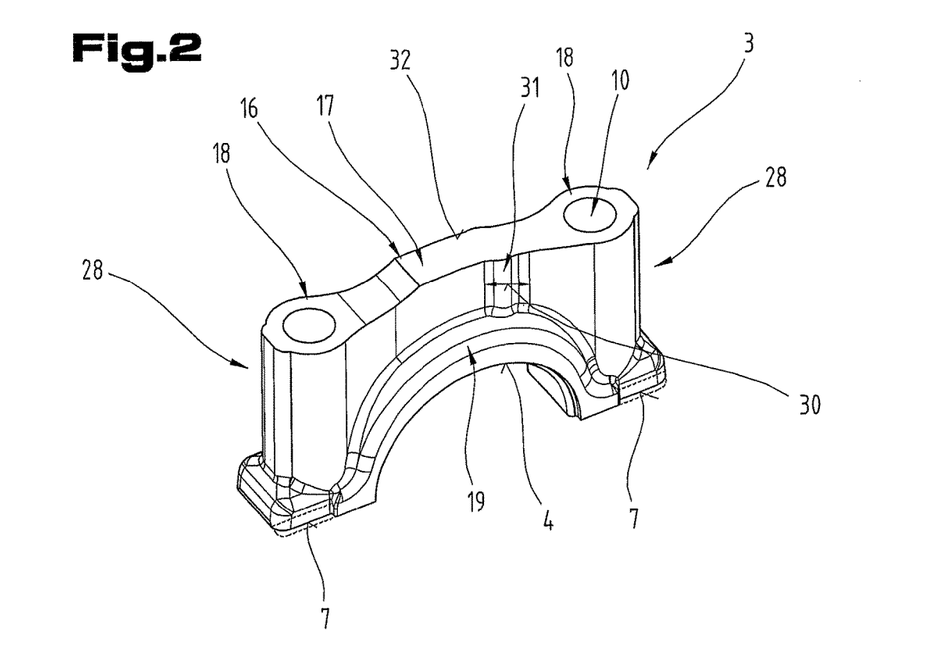
FIG. 2 a bearing cover viewed from an angle.
Figure 3:
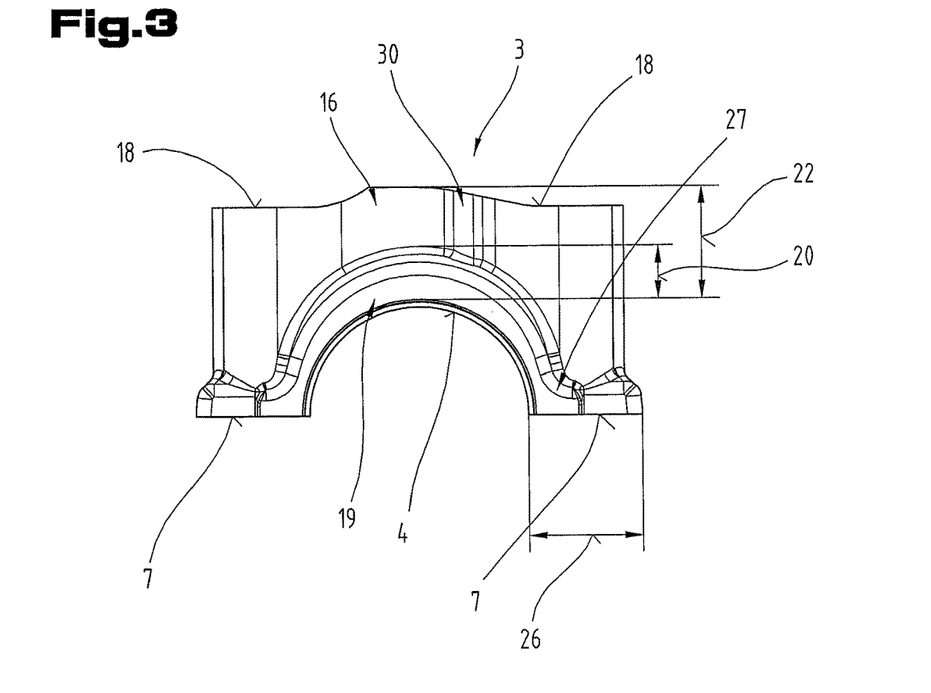
FIG. 3 a side view of the bearing cover illustrated in FIG. 2.

As may be seen more readily from FIGS. 2 and 3, a stiffening element 16, in particular of a web-shaped design, is provided between the two threaded bores 10 of the bearing cover 3. The stiffening element 16 forms at least a part of the first radially inner bearing support surface 4. As may also be seen, the stiffening element 16 may have a raised middle region 17, which projects out from the end faces 18 lying opposite the clamping surfaces 7 in the direction of a height of the bearing cover 3. The height of the bearing cover 3 is measured perpendicular to the clamping surfaces 7. Instead of the raised middle region 17, it would also be possible to provide a recessed middle region or this middle region may lie in the same plane as the end faces 18.

In particular, the stiffening element 16 is formed integrally with the rest of the bearing cover 3.

Disposed or arranged on this stiffening element 16 adjoining the first radially inner bearing support surface 4 of the bearing cover 3 and following the cross-sectional contour of this bearing support surface 4—as viewed in the axial direction 13 (FIG. 1)—is a reinforcing web 19, in particular being of an integral design with the rest of the bearing cover 3.

As may best be seen from FIG. 3, this reinforcing web 19 has a varying height 20 viewed perpendicular to the first radially inner bearing support surface 4. The tallest height 20 of the reinforcing web 19 is in the region of the half angular span, in particular precisely at the point of the half angular span, of the first radially inner bearing support surface 4. Based on an extension of the first radially inner bearing support surface 4 across 180°, the tallest height of the reinforcing web 19 is therefore at 90°, as is the case with the embodiment of the bearing cover illustrated in FIG. 3. However, the first radially inner bearing support surface 4 need not necessarily extend across 180°.

The height 20 of the reinforcing web 19 is always measured perpendicular to the first radially inner bearing support surface 4.

Figure 4:
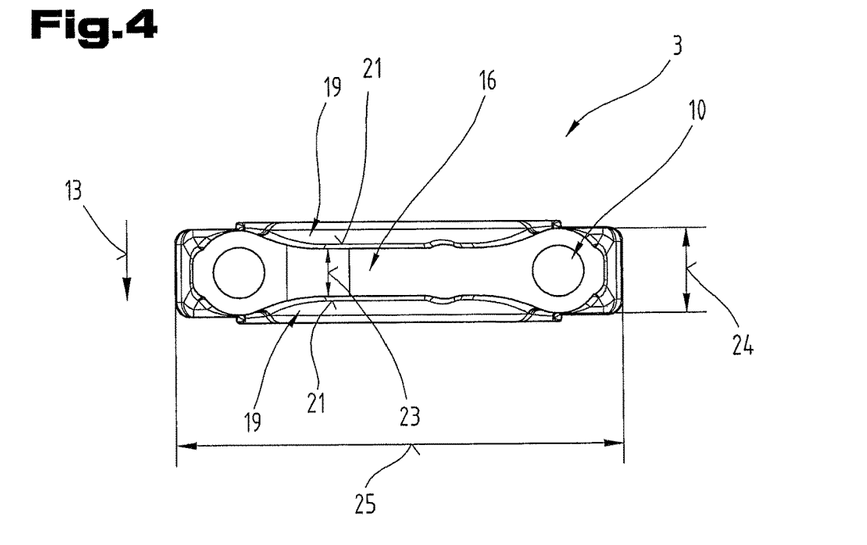
FIG. 4 a plan view of the bearing cover illustrated in FIG. 2.

Based on the preferred embodiment, the reinforcing web 19 projects out from the stiffening element 16 in the axial direction 13, as may best be seen from FIG. 4. However, it would also be possible, alternatively or in addition, for the reinforcing web 19 to have a higher density or compaction than the stiffening element 16 so that the reinforcing web 19 may also be disposed flush with the stiffening element 16.

As may also be seen from FIG. 4, at least one reinforcing web 19 is provided or disposed respectively on the two axial end faces 21 of the stiffening element 16 as described above, having the tallest height 20 (FIG. 3) in the region of the half angular span of the first radially inner bearing support surface 4.

The two reinforcing webs 19 are preferably of an identical design. However, they may also have a mutually different shape or geometry, provided the two of them are based on the described arrangement in terms of height 20 (FIG. 3).

The following explanations may be applied to both reinforcing webs 19 if they are provided on both sides, even if only one reinforcing web 19 is referred to in the description.

The reinforcing web 19 preferably has a symmetrical contour, i.e. the height 20 (FIG. 3) decreases by the same value respectively to the left and right of the half angular span of the first radially inner bearing support surface 4. Accordingly, the shortest height 20 of the reinforcing web 19 is respectively in the region of the start of the bearing support surface 4, in other words in the region of the transition from the clamping surface 7 (FIG. 3) to the bearing support surface 4.

The reinforcing web 19 may have a maximum height 20 selected from a range of 20% to 70%, in particular 30% to 60%, of a maximum height 22 (FIG. 3) of the bearing cover 3 above the bearing support surface 4. The shortest height 20 may be selected from a range of 5% to 50%, in particular 10% to 40% of the maximum height 20.

The reinforcing web 19 preferably extends uninterrupted around the entire circumference of the first radially inner bearing support surface 4. However, it would also be possible for the reinforcing web 19 to be interrupted, for example if regions with a higher density are provided in the reinforcing web 19. Higher density in this context means compared with regions of the reinforcing web 19 having a lower density.

By providing the reinforcing web 19, it is possible for a minimum width 23 (FIG. 4) of the stiffening element 16 in the axial direction 13 to be smaller than a maximum width 24 of the bearing cover 3 disposed in the region of the threaded bores 10. In other words, the stiffening element 16 is disposed in an arrangement set back from the threaded bores 10 as viewed in the axial direction 13, as may be seen from the plan view of the bearing cover 3 in FIG. 4. It is therefore possible to produce the bearing cover 3 with a lower weight than bearing covers 3 which do not have such recesses.

The minimum width 23 may be selected from a range of 5% to 95%, in particular from a range of 20% to 75%, of the maximum width 24 of the bearing cover 3.

The region having the minimum width 23 preferably extends across at least 20%, in particular at least 30%, preferably at least 50%, of a total length 25 of the bearing cover 3 as viewed in the direction parallel with the clamping surfaces 7 and perpendicular to the axial direction 13.

It is also preferable if the transition from the region of the threaded bores 10 to the region of the stiffening element 16 having the minimum width 23 is not abrupt, as may be seen from FIG. 4.

The transition from the reinforcing web 19 to the axial end face 23 of the stiffening element 16 is likewise preferably not abrupt. In particular, this transition may be provided with a rounded region.

Based on another embodiment of the bearing cover 3, the reinforcing web 19 may also be disposed above the clamping surfaces 7, as may be seen from FIG. 2 for example. This being the case, the reinforcing web 19 may extend across only a partial region of a length 26 (FIG. 3) of the clamping surfaces 7 in the direction of the total length 25 (FIG. 4) of the bearing cover 3, as illustrated by solid lines in FIG. 3, or across the entire length 26 of the clamping surfaces 7, as indicated by broken lines in FIG. 2. If the reinforcing web 19 extends across only a partial region of this length 26 of the clamping surfaces 7, it may be of a protruding design, as illustrated in FIGS. 2 to 4. In particular, the reinforcing web 19 may extend to the height of the longitudinal mid-axis through the threaded bores 10.

It is also preferable if a transition of the reinforcing web 19 above the clamping surfaces 7 to the reinforcing web 19 above the first radially inner bearing support surface 4 of the bearing cover 3 is provided with a rounded region 27 (FIG. 3).

As may be seen from FIGS. 2 and 4, regions 28 around the threaded bores 10 above the clamping surfaces 7 may likewise be recessed, thereby making an additional weight reduction of the bearing cover possible.

Figure 6:
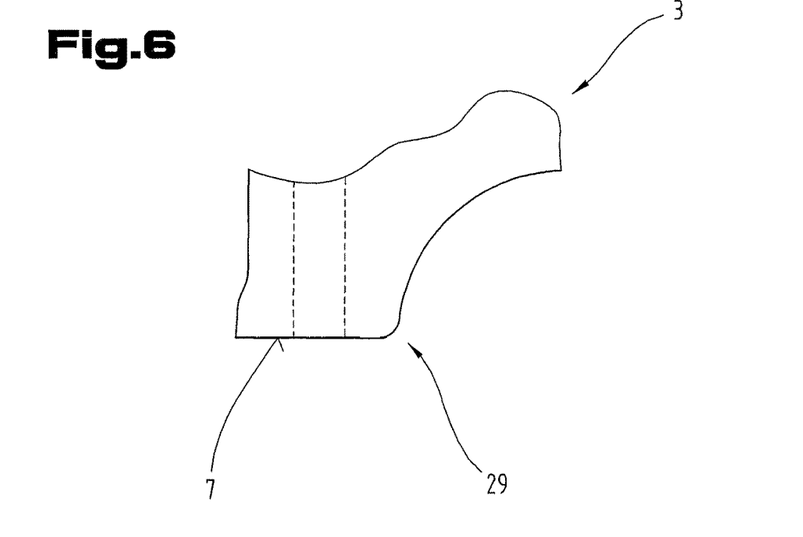
FIG. 6 a detail from one embodiment of the bearing cover.

Based on another embodiment, amongst other things with a view to obtaining a further weight reduction of the bearing cover 3, a transition 2 from the clamping surfaces 7 to the first radially inner bearing support surface 4 of the bearing cover 3 is chamfered or provided with a rounded region 29, as illustrated in FIG. 6.

Furthermore, the stiffening element 16 may be provided with at least one, in particular only one, thicker portion 30 in a certain region. The thicker portion 30 may be of a web-shaped design. The thicker portion 30 may also be disposed or arranged so as to extend perpendicular to the clamping surfaces 7 of the bearing cover 7 or parallel with the threaded bores 10. Again, a transition from this thicker portion 30 to the axial end face 21 of the stiffening element 13 preferably does not have an abrupt contour but is provided with a chamfer and/or a rounded region for example. As a result of the thicker portion 30, it is possible to further reduce the minimum width 23 (FIG. 4) of the stiffening element 13 in the axial direction 13. The thicker portion may have a width 31 (FIG. 2) in the direction of the total length 25 (FIG. 4) of the bearing cover 3 that is selected from a range of 2% to 10% of the total length 25 of the bearing cover 3.

The thicker portion preferably extends continuously at least approximately in the direction of the maximum height 22 (FIG. 3) starting from the reinforcing web 19 as far as a top end face 32 (FIG. 2) of the bearing cover 3 lying opposite the clamping surfaces 7. The expression at least approximately is intended to make allowance for the fact that the bearing cover 3 may have a raised middle region 17 (FIG. 2) and the top end face 7 does not therefore necessarily extend entirely parallel with the clamping surfaces, as may be seen from FIG. 3 for example.

Figure 7:
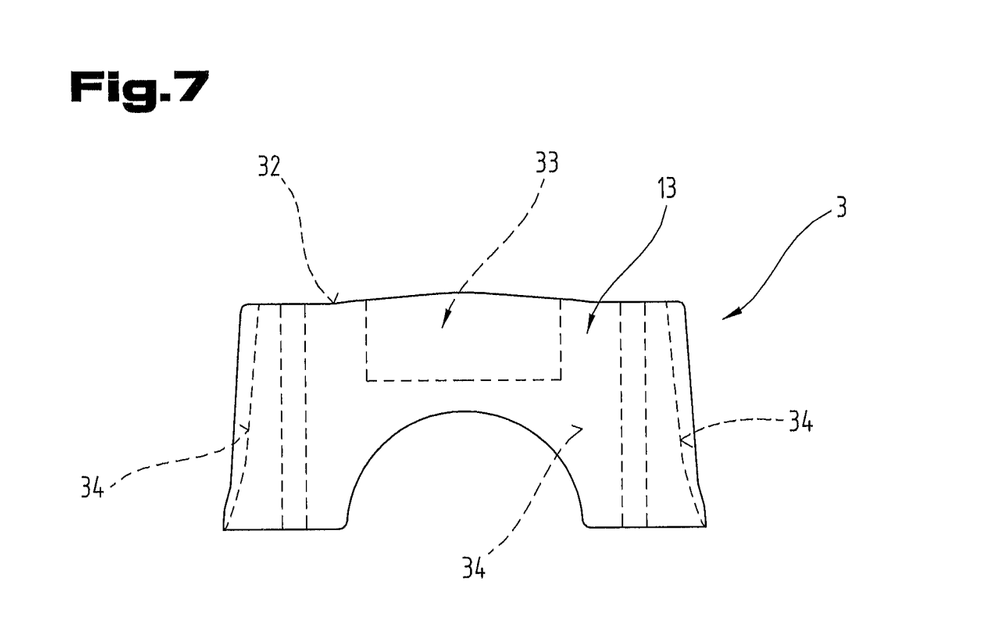
FIG. 7 a side view of another embodiment of the bearing cover.

Another embodiment for reducing the weight of the bearing cover 3 may be provided in which at least one recess 33 is provided in the stiffening element 13 of the bearing cover 3, as may be seen from FIG. 7.

The recess 33 may be provided in the form of an elongate blind bore starting from the top end face 32 of the bearing cover, as illustrated in FIG. 7. However, the recess 33 may also have a different geometry.

Figure 8:
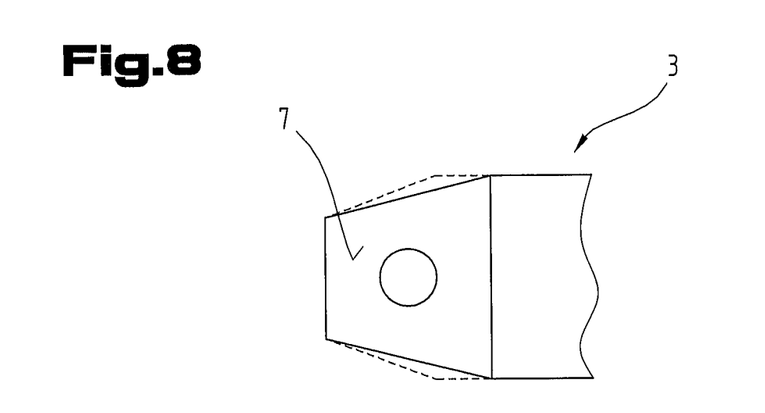
FIG. 8 a detail from another embodiment of the bearing cover in the region of a clamping surface.

Based on another embodiment of the bearing cover 3, the clamping surfaces 7 may be of an at least approximately trapezoidal shape as viewed in cross-section, as illustrated in FIG. 8. As illustrated by solid lines, therefore, the entire clamping surface 7 has a cross-section of a trapezoidal shape. However, it would also be possible for the clamping surface 7 to have this cross-section of a trapezoidal shape in only a partial region and the rest of the clamping surface has a rectangular cross-section for example, as indicated by broken lines in FIG. 8. The short base side of the trapezium is preferably disposed as illustrated, at the outer end of the clamping surfaces 7.

Based on another embodiment of the bearing cover 3, at least one, in particular several, preferably all of the end face(s) 34 has/have a conical contour, as indicated by broken lines in FIG. 7. In this instance, the conicity is such that the bearing cover 3 tapers in the direction towards the top end face 32. At least one of the lateral end faces 32 (left-hand and right-hand end face 32 in FIG. 7) and/or at least one of the two axial end faces 32 (front and rear end face in FIG. 7) may extend respectively in a conical arrangement. This enables demolding of the bearing cover green compact from the die to be improved. The angle of inclination of the end face(s) 34 relative to the vertical may be selected from a range of 2° to 15°, i.e. the angle of inclination of the end face 34 from the first clamping surface 7 to the stiffening element 16 is oblique.

The angle of inclination is preferably selected from a range of 10° to 15°, since this enables the self-locking effect to be overcome.

The illustrated examples represent possible embodiments and it should be pointed out at this stage that combinations of the individual embodiments with one another are also possible.

For the sake of good order, finally, it should be pointed out that in order to provide a better understanding of the structure of the bearing cover 3, it is not necessarily illustrated to scale.

List of reference numbers

| | |
|---|---|
| 1 | Bearing arrangement |
| 2 | Bearing block |
| 3 | Bearing cover |
| 4 | Bearing support surface |
| 5 | Bearing support surface |
| 6 | Friction bearing |
| 7 | Clamping surface |
| 8 | Co-operating clamping surface |
| 9 | Projection |
| 10 | Threaded bore |
| 11 | Front face |
| 12 | Rear face |
| 13 | Axial direction |
| 14 | Middle region |
| 15 | End region |
| 16 | Stiffening element |
| 17 | Raised middle region |
| 18 | End face |
| 19 | Reinforcing web |
| 20 | Height |
| 21 | End face |
| 22 | Maximum height |
| 23 | Width |
| 24 | Width |
| 25 | Total length |
| 26 | Length |
| 27 | Rounded region |
| 28 | Region |
| 29 | Rounded region |
| 30 | Thicker portion |
| 31 | Width |
| 32 | End face |
| 33 | Recess |
| 34 | End face |

The invention claimed is:

1. A bearing cover for a split bearing, the bearing cover comprising:
    (a) a first clamping surface and a second clamping surface, the first clamping surface and the second clamping surface being adapted to lie in contact with co-operating clamping surfaces of a bearing block;
    (b) a first threaded bore in the first clamping surface and a second threaded bore in the second clamping surface;
    (c) a stiffening element between the first and the second threaded bores;
    (d) a first radially inner bearing support surface between the first and second clamping surfaces having an at least approximately arcuate cross-sectional contour when viewed in an axial direction; and
    (e) a reinforcing web provided on the stiffening element adjoining the first radially inner bearing support surface, the reinforcing web having a web contour corresponding to the cross-sectional contour of the first radially inner bearing support surface;
    wherein the reinforcing web has a varying height as measured perpendicularly from the first radially inner bearing support surface;
    wherein a tallest height of the reinforcing web is disposed in a region of the first radially inner bearing support surface halfway between the first and second clamping surfaces;
    wherein the tallest height is selected from a range of 20% to 70% of a maximum height of the bearing cover above the first radially inner bearing support surface;
    wherein a minimum width of the stiffening element in the axial direction is smaller than a maximum width of the bearing cover in the axial direction disposed in a region of the threaded bores; and
    wherein the bearing cover is made from a sintered material using a powder metallurgical process.

2. The bearing cover according to claim 1, wherein the reinforcing web extends over the first and second clamping surfaces.

3. The bearing cover according to claim 2, wherein the reinforcing web has a first rounded transition region where the reinforcing web above the first clamping surface transitions to the reinforcing web above the first radially inner bearing support surface and a second rounded transition region where the reinforcing web above the second clamping surface transitions to the reinforcing web above the inner bearing support surface.

4. The bearing cover according to claim 1, further comprising a first chamfered region where the first clamping surface transitions to the first radially inner bearing support surface and a second chamfered region where the second clamping surface transitions to the first radially inner bearing support surface.

5. The bearing cover according to claim 1, wherein a region of the stiffening element is provided with a thicker portion.

6. The bearing cover according to claim 1, wherein at least one recess is provided in the stiffening element.

7. The bearing cover according to claim 1, wherein each of the first and second clamping surfaces has an at least approximately trapezoidal shape.

8. The bearing cover according to claim 1, further comprising a first end face extending at an oblique angle from the first clamping surface to the stiffening element.

9. A bearing arrangement having a bearing cover and a bearing block lying in contact therewith, wherein the bearing cover is as specified in claim 1.

* * * * *